(12) United States Patent
Roleder

(10) Patent No.: US 9,032,864 B2
(45) Date of Patent: May 19, 2015

(54) CONTAINER ASSEMBLY FOR AGING A LIQUID

(76) Inventor: Jonathan W. Roleder, San Diego, CA (US)

( * ) Notice: Subject to any disclaimer, the term of this patent is extended or adjusted under 35 U.S.C. 154(b) by 334 days.

(21) Appl. No.: 13/502,140

(22) PCT Filed: Oct. 14, 2010

(86) PCT No.: PCT/US2010/052721
§ 371 (c)(1),
(2), (4) Date: Apr. 15, 2012

(87) PCT Pub. No.: WO2011/047187
PCT Pub. Date: Apr. 21, 2011

(65) Prior Publication Data
US 2012/0204728 A1   Aug. 16, 2012

Related U.S. Application Data

(60) Provisional application No. 61/252,518, filed on Oct. 16, 2009.

(51) Int. Cl.
*C12G 3/06* (2006.01)
*C12H 1/22* (2006.01)
(Continued)

(52) U.S. Cl.
CPC ... *C12G 3/065* (2013.01); *C12H 1/14* (2013.01); *C12H 1/22* (2013.01)

(58) Field of Classification Search
CPC .................................. C12G 3/065; C12H 1/22
USPC .............. 99/277.1, 277.2; 239/140, 556, 557, 239/558, 597; 261/85, 87, 93
See application file for complete search history.

(56) References Cited

U.S. PATENT DOCUMENTS 429,826 A * 6/1890 Wagoner .................... 99/277.1
2,017,235 A   10/1935 Drew
(Continued)

FOREIGN PATENT DOCUMENTS

| DE | 102006053858 A1 | 5/2008 |
| FR | 2864965 | * 7/2005 |
| WO | WO03022983 A1 | 3/2003 |

OTHER PUBLICATIONS

First Examination Report, New Zealand Intellectual Property Office, Nov. 7, 2013, New Zealand Application No. 617289 (related application).

(Continued)

*Primary Examiner* — Reginald L Alexander
(74) *Attorney, Agent, or Firm* — Roeder & Broder LLP

(57) ABSTRACT

A container assembly (10) for retaining a liquid (16) during aging of the liquid (16) comprises a container (12) and an oxygenator (230). The container (12) includes a container body (14) that defines a chamber (14A) that receives and retains liquid (16). The oxygenator (230) is positioned substantially within the chamber (14A). The oxygenator (230) includes a fluid source (662), one or more diffusers (672), and a valve (670). The one or more diffusers (672) are in fluid communication with the fluid source (662). The valve (670) selectively controls the introduction of a fluid from the fluid source (662) into the liquid (16) through the one or more diffusers (672). The container assembly (10) further comprises an insert retainer assembly (338) and one or more flavor inserts (440) that are received and retained by the insert retainer assembly (338).

20 Claims, 7 Drawing Sheets

(51) Int. Cl.
*C12G 3/07* (2006.01)
*C12H 1/14* (2006.01)

(56) References Cited

U.S. PATENT DOCUMENTS

| | | | |
|---|---|---|---|
| 2,135,622 A | | 11/1938 | Nagle |
| 2,289,245 A | | 7/1942 | Dant |
| 2,657,629 A | | 11/1953 | Gibson |
| 3,021,780 A | | 2/1962 | Bobbe |
| 3,119,321 A | | 1/1964 | Deal |
| 4,073,955 A | | 2/1978 | Koppelman |
| 4,210,676 A | | 7/1980 | Dudar et al. |
| 4,558,639 A | | 12/1985 | Hojnoski |
| 4,838,419 A | | 6/1989 | Weits et al. |
| 5,013,490 A | * | 5/1991 | Tanimoto et al. ............ 261/87 |
| 5,054,381 A | | 10/1991 | De Peaux et al. |
| 5,092,488 A | | 3/1992 | Pradel |
| 5,311,811 A | | 5/1994 | Kuzyk |
| 5,537,913 A | | 7/1996 | Vowles |
| 5,647,268 A | | 7/1997 | Sullivan |
| 5,960,708 A | | 10/1999 | De Temple et al. |
| 6,032,571 A | * | 3/2000 | Brous et al. ............ 99/277.2 |
| 6,378,419 B1 | | 4/2002 | Ecklein |
| 7,186,428 B1 | | 3/2007 | Huige et al. |
| 7,284,476 B2 | | 10/2007 | Roleder |
| 2006/0000362 A1 | | 1/2006 | Roleder |
| 2008/0000356 A1 | | 1/2008 | Eustis |
| 2011/0070330 A1 | * | 3/2011 | Watson et al. ............ 426/11 |

OTHER PUBLICATIONS

Supplemental European Patent Office Search Report for PCT/US2010/052721, Jonathan William Roleder (related application).
PCT Notification of Transmittal of International Preliminary Report on Patentability with Written Opinion for PCT Application No. PCT/US2010/052721 dated Apr. 26, 2012 (related to present application), Roleder, Jonathan.
Tagliabue, John, "Wine Without Barrels? Sacre Bleu!" Oct. 5 or 6, 2003, 2 pages, New York Times, NY.
Oak Alternatives, Tank Stave Systems, "Tank Stave Systems," Nov. 11, 2003, 3 pages, http://www.worldcooperage.com/pages/product_alt_tss.html.
Oak Alternatives, Barrel Renewal Systems, "Product Information & Ordering." Nov. 11, 2003, 4 pages, http://www.worldcooperage.com/media/cartimages/alt_brs_1×1_large.jpg.
Barrel Builders, Inc.,"Barrel Builders: Insert Systems." Nov. 11, 2003, 3 pages, Napa Valley, CA; http://barrelbuilders.com/pg15.htm.
PCT/US2005/022791 filed Jun. 25, 2005, Roleder, Jonathan PCT International Application No. PCT/US2005/022791 and its entire prosecution history.
PCT Notification Concerning Preliminary Report on Patentability for PCT Application No. PCT/US2005/022791 dated Jan. 18, 2007, Roleder, Jonathan.
PCT/US2010/052721 (related to present application) filed Oct. 14, 2010, Roleder Jonathan PCT International Application No. PCT/US2010/052721 and its entire prosecution history.
PCT Notification of Transmittal of International Search Report and Written Opinion for PCT Application No. PCT/US2010/052721 dated Dec. 20, 2010 (related to present application), Roleder, Jonathan.
Microoxygenation—Wikipedia, the free encyclopedia, Apr. 13, 2012, 2 pages, http://en.wikipedia.org/wiki/Microoxygenation.
Patent Examination Report No. 1, Australia Intellectual Property Office, Aug. 27, 2014, Australia Application No. 2010306781 (related application).
Extended European Patent Office Search Report for EP1418350.1, Jonathan William Roleder (related application).

* cited by examiner

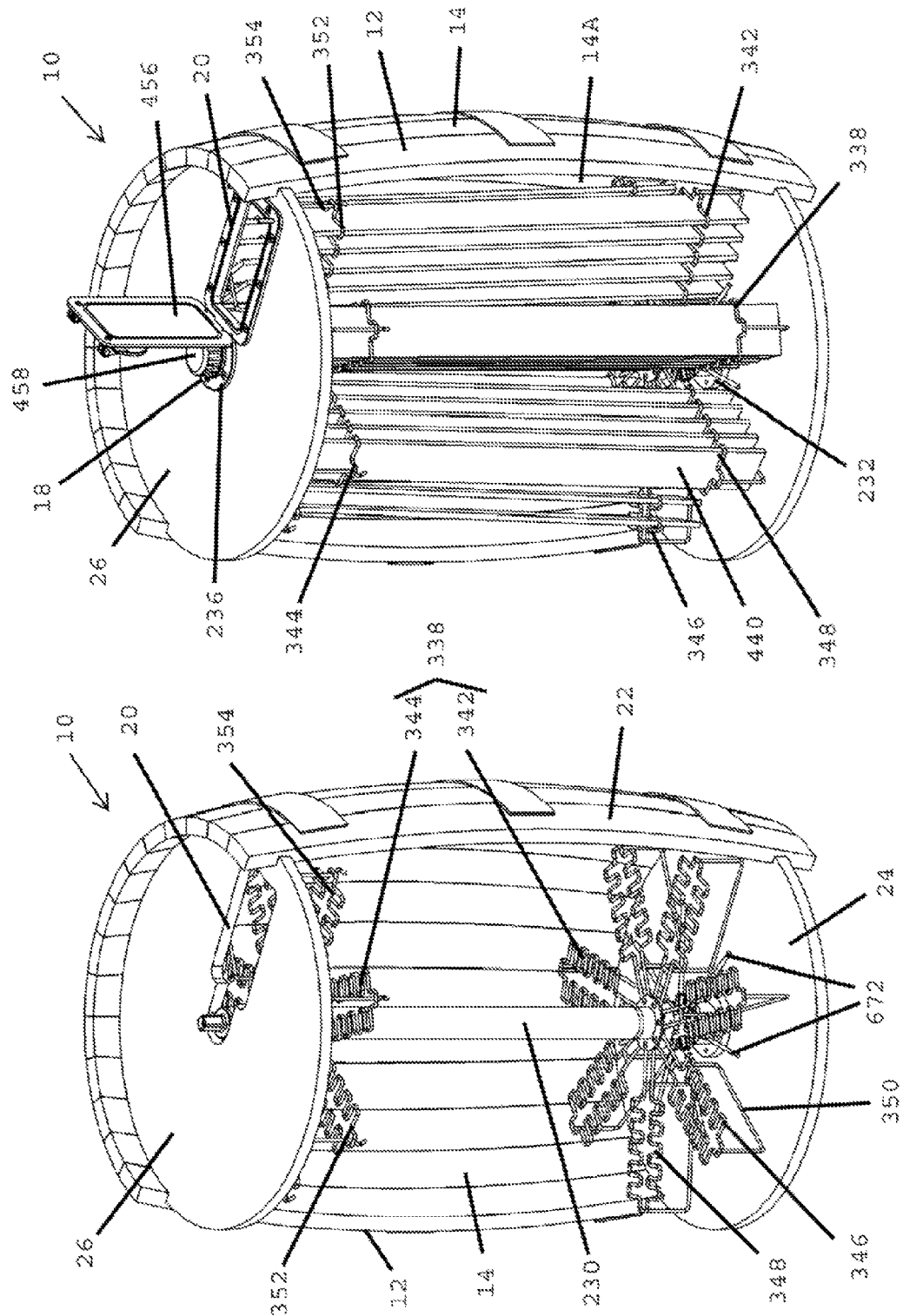

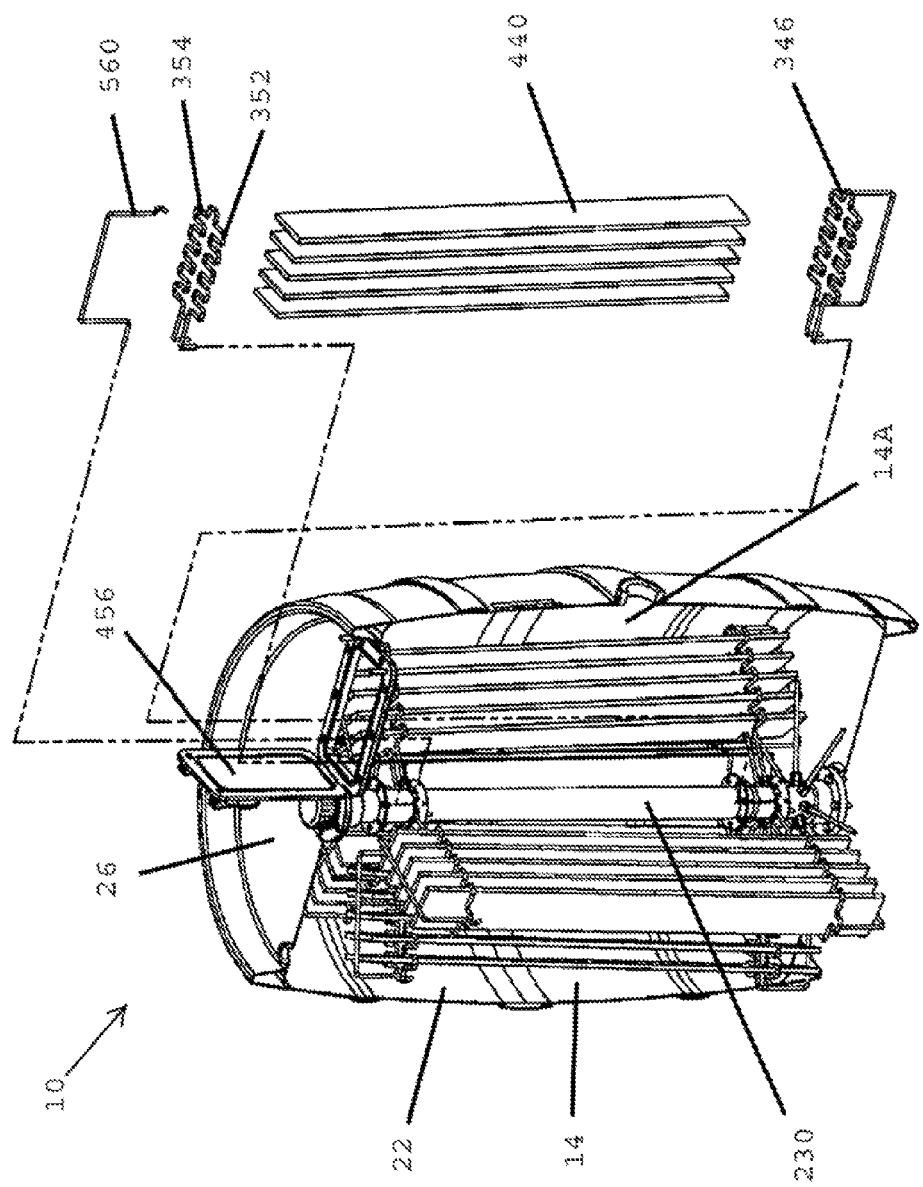

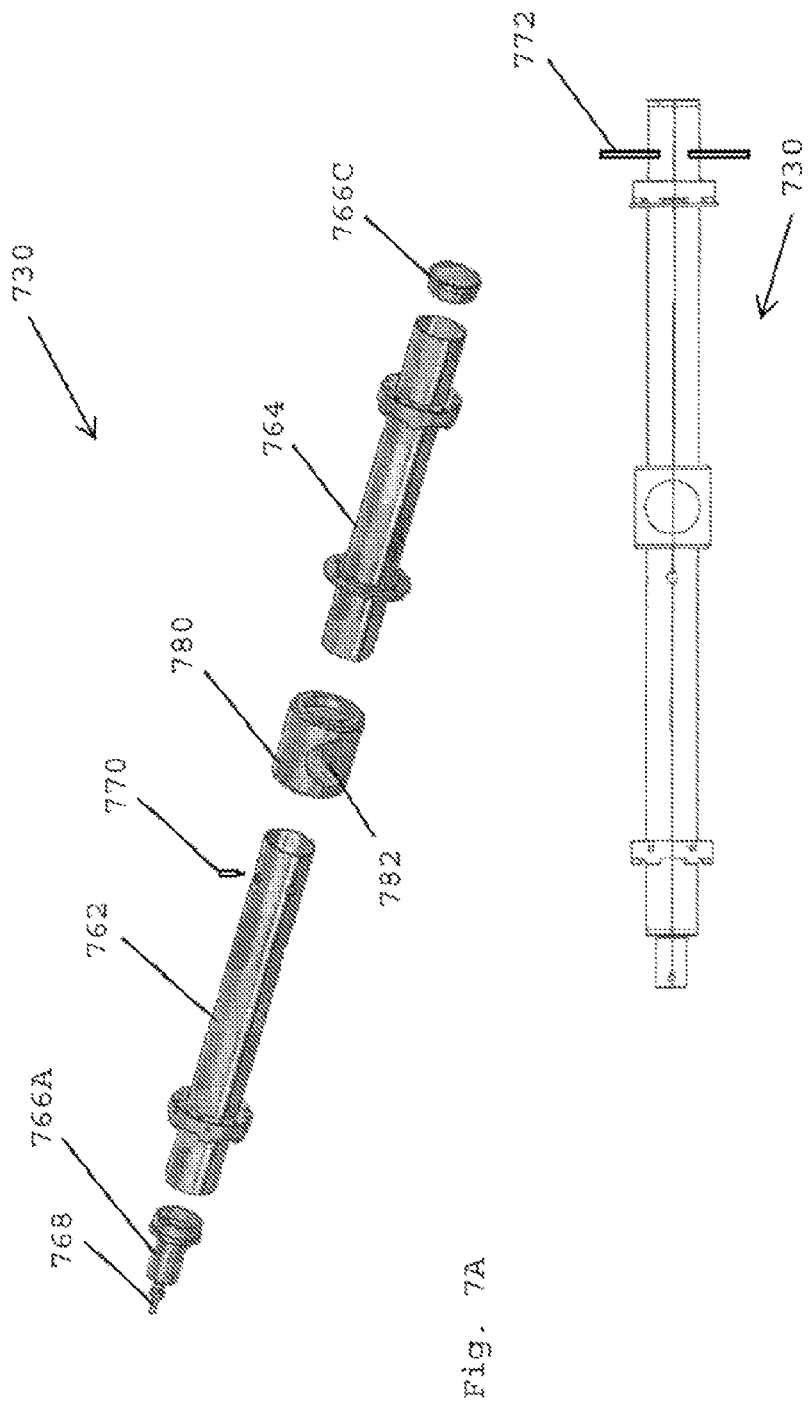

CONTAINER ASSEMBLY FOR AGING A LIQUID

RELATED APPLICATION

This application claims priority on U.S. Provisional Application Ser. No. 61/252,518 filed on Oct. 16, 2009 and entitled "Installation and Procedure for Introducing Micro Oxygenation Into a Vessel for Aging a Liquid". As far as is permitted, the contents of U.S. Provisional Application Ser. No. 61/252,518 are incorporated herein by reference.

BACKGROUND

Wood barrels are commonly used to age wine and other beverages. Unfortunately, wood barrels are relatively expensive to make and have a relatively short operational life. For example, a high end barrel used for only the finest wines is typically made from French oak and is very expensive. Additionally, the chemical ability of the wood to effect and impart flavor nuances expires rapidly and a wood barrel can typically only be considered to be in its prime for two to three years, e.g. one to two vintages. Once the traditional wood barrel had exhausted its chemical ability to impart flavors on the liquid, i.e. has gone "oak neutral", the conventional barrel is often sold on the used market or committed to lesser quality beverages. This creates a rapidly depreciating asset and investment for the beverage maker. One previous method for addressing this issue is disclosed in U.S. Pat. No. 7,284,476 issued to Roleder. As far as is permitted, the contents of U.S. Pat. No. 7,284,476 are incorporated herein by reference.

Moreover, traditional wood barrels have always allowed oxygen to pass through the wood construction of the barrel, thereby introducing micro-oxygenation (i.e. small amounts of oxygen) into the wine or other beverages during the aging process. However, when wine is aged in a non-breathing vessel such as a stainless steel tank, micro-oxygenation is not happening naturally anymore. Accordingly, alternative methods have been created in order to introduce oxygen into the liquid. Modern micro-oxygenation technology involves a process used in winemaking whereby oxygen is introduced into the wine in a controlled manner so as to precisely control the amount and rate of oxygen released into the wine while it is aging.

A typical micro-oxygenation process involves a large two-chamber device with valves interconnected to a tank of oxygen. In the first chamber the oxygen is calibrated to match the volume of the wine. In the second chamber the oxygen is injected into the wine through a porous ceramic stone or sintered stainless steel diffusers located at the bottom of the chamber. Unfortunately, this process has provided less than ideal results in barrels. For example, this process has increased space requirements as the oxygen chamber must be connected with tubes to each of the barrels.

Accordingly, new devices and processes are desired which can introduce micro-oxygenation into the liquid in a well-controlled manner, and which can impart flavors on the liquid, utilizing equipment that is simple, compact, reliable, durable and affordable.

SUMMARY

The present invention is directed to a container assembly for retaining a liquid during aging of the liquid. In certain embodiments, the container assembly comprises a container and an oxygenator. The container includes a container body that defines a chamber that receives and retains the liquid. The oxygenator is positioned substantially within the chamber. In one embodiment, the oxygenator includes a fluid source, one or more diffusers, and a valve. The one or more diffusers are in fluid communication with the fluid source. The valve selectively controls the introduction of a fluid from the fluid source into the liquid through the one or more diffusers. With this design, because the oxygenator is positioned in the container assembly, the container assembly is a self-contained system for aging the liquid.

In one embodiment, the container assembly further comprises an oxygenator mount assembly that rotatably secures the oxygenator to the container body.

Additionally, in one embodiment, the oxygen source is a tank that is positioned substantially within the chamber. In such embodiment, the valve regulates the volume and rate of flow of the fluid that is being introduced from the tank into the liquid.

Further, in some embodiments, the container assembly further comprises an insert retainer assembly and one or more flavor inserts. The insert retainer assembly is mounted about the oxygenator within the chamber. Moreover, the insert retainer assembly selectively receives and retains the one or more flavor inserts within the chamber. In certain embodiments, the container further includes a container aperture that extends through the container body. The container aperture can have a size that is less than approximately twenty-five percent of the total surface area of a top of the container body. In one embodiment, the container aperture has a size that is between approximately five percent and ten percent of the total surface area of the top of the container body.

Additionally, in one embodiment, the container aperture extends outward radially from the center of the top of the container body. In some embodiments, the insert retainer assembly can include a plurality of lower retainer arms that are selectively rotatable relative to the container body. In one such embodiment, only a single lower retainer arm can be positioned within and/or removed from the chamber through the container aperture at any given rotational position of the lower retainer arms. Moreover, in one embodiment, each lower retainer arm is adapted to receive a row of flavor inserts. In such embodiment, only a single row of flavor inserts can be positioned within and/or removed from the chamber through the container aperture at any given rotational position of the lower retainer arms.

Further, in some embodiments, the insert retainer assembly can further include a plurality of upper retainer arms that are selectively rotatable relative to the container body. In one such embodiment, only a single upper retainer arm can be positioned within and/or removed from the chamber through the container aperture at any given rotational position of the upper retainer arms.

Still further, in one embodiment, the container assembly further comprises an access door that selectively closes and seals the container aperture.

Additionally, the present invention is directed to a method for retaining a liquid during aging of the liquid.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a perspective view of a portion of the container assembly illustrated in FIG. 1;

FIG. 4 is a perspective view of a portion of the container assembly illustrated in FIG. 1;

FIG. 5 is a partially exploded perspective view of a portion of the container assembly illustrated in FIG. 1;

FIG. 7A is a partially exploded perspective view of another embodiment of an oxygenator having features of the present invention;

FIG. 7B is a side view of the oxygenator illustrated in FIG. 7A; and

DESCRIPTION

Figure 1:
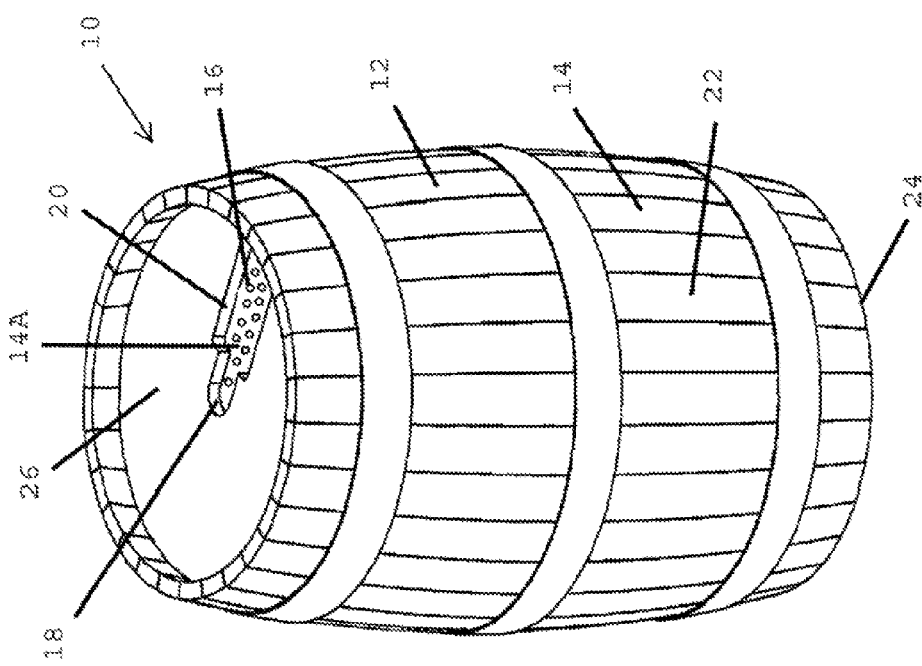
FIG. 1 is a perspective view of one embodiment of a portion of a container assembly having features of the present invention.

FIG. 1 is a perspective view of one embodiment of a portion of a container assembly 10 having features of the present invention. The size, shape, and number of components in the container assembly 10 can be varied to suit the design requirements of the container assembly 10. In the embodiment illustrated in FIG. 1, the container assembly 10 includes a container 12 having (i) a container body 14 that retains a liquid 16 (illustrated as circles), (ii) a first container aperture 18 (also referred to herein as a rotator aperture), and (iii) a second container aperture 20 (also referred to herein as an insert aperture). It should be noted that the use of the terms "first container aperture" and "second container aperture" is merely for ease of discussion, and either container aperture can be referred to as the first container aperture or the second container aperture.

In the embodiment illustrated in FIG. 1, the container body 14 is generally barrel shaped having a tubular-shaped side wall 22, a disk-shaped bottom 24 (illustrated more clearly in FIG. 2), and a substantially disk-shaped top 26. Alternatively, for example, the container body 14 can be another shape, e.g. rectangular box shaped.

Additionally, the container body 14 defines a chamber 14A that receives and retains the liquid 16 during an aging process. In alternative non-exclusive embodiments, the chamber 14A is sized and shaped to retain approximately 5, 10, 25, 55, 100, 500, 1000, 2500 or 5000 gallons of liquid 16. However, the chamber 14A can be larger or smaller. Further, in certain embodiments, the container body 14 can include a bunghole (not illustrated) that is positioned within and/or extends through the container body 14. The bunghole is adapted to receive a pipe or other conduit (not illustrated) that can be used for filling the liquid 16 into the chamber 14A, pumping or otherwise removing the liquid 16 from the chamber 14A, or racking of the liquid 16 within the chamber 14A. In alternative such embodiments, the bunghole can be positioned in the side wall 22, in the bottom 24, or in the top 26 of the container body 14.

As described herein, the container assembly 10 can be used to impart a flavor on the liquid 16 during an aging process. Additionally, the container assembly 10 can be used to introduce micro-oxygenation (i.e. small amounts of oxygen) into the liquid 16 during the aging process. In one embodiment, the container assembly 10 allows for the total control of the aging of the liquid 16, including optimum processing and aging opportunities for the liquid 16. Stated another way, the container assembly 10 can be used to precisely create the perfect environment for aging the liquid 16 so that the highest quality beverage can be achieved. Further, the container assembly 10 can be easily adjusted to be used for different types of liquids 16 and the container assembly 10 can be adjusted during the aging process, if necessary, to alter the aging process.

The type of liquid 16 aged in the container assembly 10 can vary. For example, the liquid 16 can be a red wine, white wine, port, whiskey, brandy, or other beverages.

In one embodiment, the container body 14 can be made from a stainless steel material, which imparts no flavor on the liquid 16, and which does not allow for oxygen to be naturally introduced into the liquid 16. Alternatively, in certain embodiments, the container body 14 can be made from a wood material or some other suitable food grade material. Additionally and/or alternatively, in one embodiment, certain components of the container assembly 10, as described herein, can be utilized to retrofit and extend the service life of existing wood barrels that are no longer able to sufficiently impart flavors on the liquid 16.

As will be described in greater detail below, the first container aperture 18, i.e. the rotator aperture, is utilized to assist in the installation and positioning of and/or providing access to certain additional components of the container assembly 10. The first container aperture 18 is positioned within and/or extends through the container body 14. As shown in the embodiment illustrated in FIG. 1, the first container aperture 18 can be somewhat U-shaped and can be positioned substantially in the center of the top 26 of the container body 14. Alternatively, the first container aperture 18 can have a different shape and/or can be positioned in a different portion of the container body 14.

Further, as will be described in greater detail below, the second container aperture 20, i.e. the insert aperture, is utilized to assist in the installation and positioning of and/or providing access to certain additional components of the container assembly 10. The second container aperture 20 is positioned within and/or extends through the container body 14. As shown in the embodiment illustrated in FIG. 1, the second container aperture 20 can be substantially rectangle shaped and can be positioned within the top 26 of the container body 14 such that the second container aperture 20 is co-extensive with the first container aperture 18. Alternatively, the second container aperture 20 can have a different shape and/or be positioned in a different portion of the container body 14. For example, in one alternative embodiment, the second container aperture 20 is spaced apart from the first container aperture 18.

Additionally, the size of the second container aperture 20 can vary. For example, in certain embodiments, the size of the second container aperture 20 can be such that it is less than approximately twenty-five percent (25%) of the total surface area of the top 26 of the container body 14. More particularly, in one embodiment, the size of the second container aperture 20 can be between approximately five percent (5%) and ten percent (10%) of the total surface area of the top 26 of the container body 14. For example, in one non-exclusive embodiment, the second container aperture 20 can be substantially rectangle shaped and can be approximately four inches wide by eight inches long radially. Alternatively, the second container aperture 20 can be a different size. For example, the second container aperture 20 can be greater than twenty-five percent (25%) of the total surface area of the top 26 of the container body 14 or less than five percent (5%) of the total surface area of the top 26 of the container body 14.

Further, as illustrated in this embodiment, the second container aperture 20 can extend radially away from the first container aperture 18, i.e. radially away from the center of the top 26 of the container body 14 to the perimeter of the top 26. Moreover, as described in detail below, the second container aperture 20 is sized and shaped so that an oxygenator 230 (illustrated in FIG. 2), an insert retainer assembly 338 (illustrated in FIG. 3), and one or more flavor inserts 440 (illustrated in FIG. 4) can quickly and easily be installed within and/or removed from the container body 14 in modular fashion through the second container aperture 20.

Additionally, the container apertures 18, 20 are uniquely designed to be small enough so that the container apertures 18, 20 do not influence the structural integrity (significantly reduce the strength) of the top 26 of the container body 14. Thus, the design of the container apertures 18, 20 enables multiple containers to be stacked together on their sides without negatively impacting the seal of the container apertures 18, 20 and/or causing the container 12 to leak.

Figure 2:
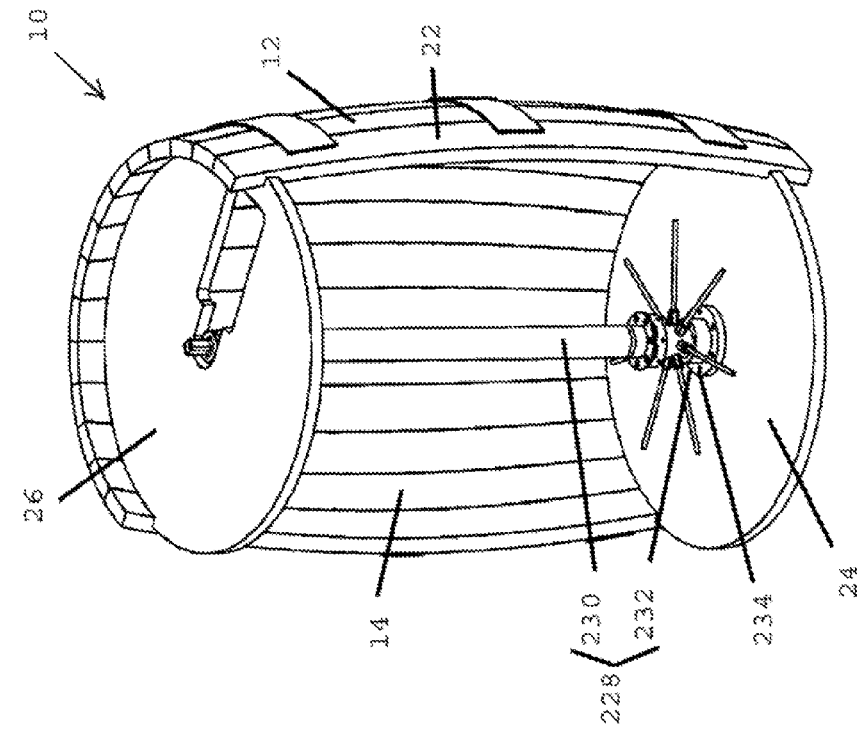
FIG. 2 is a perspective view of a portion of the container assembly illustrated in FIG. 1.

FIG. 2 is a perspective view of a portion of the container assembly 10 illustrated in FIG. 1. In particular, FIG. 2 illustrates that the container assembly 10 further includes an oxygenation assembly 228 that introduces a controlled amount of a fluid, e.g., oxygen, to the liquid 16 (illustrated in FIG. 1) during the aging process. It should be noted that a portion of the side wall 22 has been removed in FIG. 2 so as to enable the viewing of the oxygenation assembly 228 as it is positioned within the container body 14.

Additionally, it should be noted that although the present invention is described herein as utilizing the oxygenation assembly 228 to introduce a controlled amount of oxygen to the liquid 16 during the aging process, the present invention is equally able to utilize the oxygenation assembly 228 to introduce one or more alternative fluids to the liquid 16.

In one embodiment, the oxygenation assembly 228 can have a modular design such that the oxygenation assembly 228 can be positioned within and/or removed from the container body 14 through the second container aperture 20 without removing the top 26 of the container body 14, and without otherwise disassembling the container 12.

The design of the oxygenation assembly 228 can be varied to suit the specific design requirements of the container assembly 10. As illustrated in FIG. 2, the oxygenation assembly 228 includes an oxygenator 230 and an oxygenator mount assembly 232.

The oxygenator 230 can be precisely controlled in order to release oxygen into the liquid 16 at any desired rate and time. This integrated micro-oxygenation release system has been created to simulate the natural breathing of a wood barrel in a non-breathing aging container, like a stainless steel barrel. The specific design of the oxygenator 230 will be described in greater detail below.

In one embodiment, the oxygenator mount assembly 232 includes a lower mount 234 for securing and/or mounting the oxygenator 230 substantially adjacent to the bottom 24 of the container body 14, and an upper mount 236 (illustrated in FIG. 4) for securing and/or mounting the oxygenator 230 substantially adjacent to the top 26 of the container body 14.

As shown in FIG. 2, the lower mount 234 is substantially centrally located along the bottom 24 of the container body 14 and is adapted to receive and retain the oxygenator 230 when the oxygenator 230 is positioned within the container body 14. In certain non-exclusive alternative embodiments, the lower mount 234 can be secured to the bottom 24 of the container body 14 with screws, by welding, or by some other method. Somewhat similarly, the upper mount 232 is substantially centrally located along the top 26 of the container body 14 and is adapted to receive and retain the oxygenator 230 when the oxygenator is positioned within the container body 14. In certain non-exclusive alternative embodiments, the upper mount 232 can be secured to the top 26 of the container body 14 with screws, by welding, or by some other method. Alternatively, the oxygenator mount assembly 232 can have a different design and/or the lower mount 234 and the upper mount 236 can be positioned in different locations relative to the container body 14. In one embodiment, at least one of the mounts 232, 234 includes a bearing (not illustrated) that allows for easy rotation of the oxygenator 230 relative to the container body 14.

In one embodiment, as illustrated in FIG. 2, a portion of the oxygenator 230 can be positioned within and/or extend through the first container aperture 18. With this design, the user is better able to access the oxygenator 230 in order to add or remove oxygen from the oxygenator 230 and to control the release of oxygen into the liquid 16 that is present within the container body 14.

FIG. 3 is a perspective view of a portion of the container assembly 10 illustrated in FIG. 1. In particular, FIG. 3 illustrates that the container assembly 10 further includes an insert retainer assembly 338 for receiving and retaining one or more flavor inserts 440 (illustrated in FIG. 4) as a means to impart a flavor on the liquid 16 (illustrated in FIG. 1) during the aging process. It should be noted that a portion of the side wall 22 has been removed in FIG. 3 so as to enable the viewing of the insert retainer assembly 338 as it is positioned within the container body 14.

In one embodiment, the insert retainer assembly 338 can have a modular design such that the insert retainer assembly 338 can be positioned within and/or removed from the container body 14 through the second container aperture 20 without removing the top 26 of the container body 14, and without otherwise disassembling the container 12.

The design of the insert retainer assembly 338 can be varied to suit the specific design requirements of the container assembly 10. As illustrated in FIG. 3, the insert retainer assembly 338 includes a lower retainer 342 and an upper retainer 344 that cooperate to selectively retain the one or more flavor inserts 440 spaced apart from the container body 14. Alternatively, the insert retainer assembly 338 can have a different design. For example, in one alternative embodiment, the insert retainer assembly 338 can be designed so as to allow the one or more flavor inserts 440 to contact the container body 14 when the flavor inserts 440 are positioned within the container body 14.

As illustrated in this embodiment, the lower retainer 342 can be mounted about the oxygenator 230 near the bottom 24 of the container body 14. Alternatively, the container assembly 10 could include a retainer tube that substantially surrounds the oxygenator 230, and the lower retainer 342 could be mounted about the retainer tube near the bottom 24 of the container body 14. Still alternatively, the lower retainer 342 can be mounted within the container body 14 in a different position and/or in a different manner.

Additionally, in the embodiment illustrated in FIG. 3, the lower retainer 342 includes a plurality of lower retainer arms 346 that extend radially away from the oxygenator 230 toward the side wall 22 of the container body 14. In this embodiment, the lower retainer 342 includes seven lower retainer arms 346 that are substantially evenly spaced about the oxygenator 230. Alternatively, the lower retainer 342 can include more than seven or less than seven lower retainer arms 346, depending on the number of flavor inserts 440 that are desired to be retained within the container body 14.

In one embodiment, the second container aperture 20 is uniquely sized and shaped so that only one lower retainer arm 346 can be positioned within and/or removed from the container body 14 through the second container aperture 20 at any given rotational position of the lower retainer 342. In such embodiment, after each lower retainer arm 346 is positioned within and/or removed from the container body 14 through the second container aperture 20, the lower retainer 342 can be rotated, e.g., via rotation of the oxygenator 230, so that another lower retainer arm 346 can be individually positioned within and/or removed from the container body 14 through the second container aperture 20.

Further, in this embodiment, each lower retainer arm 346 includes a step-like design that defines a plurality of insert openings 348, wherein each insert opening 348 is sized and shaped to selectively receive and retain one of the flavor inserts 440. As illustrated, each lower retainer arm 346 can include five insert openings 348 for selectively receiving and retaining up to five flavor inserts 440. Alternatively, each lower retainer arm 346 can be designed to include more than five or less than five insert openings 348, depending on the number of flavor inserts 440 that are desired to be retained within the container body 14. Additionally, in this embodiment, each of the insert openings 348 is a generally rectangular shaped opening that is slightly larger than the cross-section of the flavor inserts 440. Alternatively, for example, one or more of the insert openings 348 can be another shape, such as a circle, a triangle or an octagon.

Still further, as illustrated, each lower retainer arm 346 can include an arm base 350 that extends downward from and underneath the remainder of the lower retainer arm 346. In particular, the arm base 350 can be selectively coupled to the lower retainer arm 350 near an outer edge of the lower retainer arm 350, i.e. near the edge of the lower retainer arm 350 closest to the side wall 22 of the container body 14. Further, the arm base 350 can be selectively coupled to the outer surface of the oxygenator 230 and/or to an inner edge of the lower retainer arm 350 substantially adjacent to the oxygenator 230. With this design, when the flavor inserts 440 are positioned within the insert openings 348, the flavor inserts 440 are supported at one end by the arm base 350, such that the flavor inserts 440 are maintained spaced apart from the bottom 24 of the container body 14. Alternatively, the lower retainer arms 346 can be designed without the arm base 350, and the flavor inserts 440 can be allowed to contact the bottom 24 of the container body 14 or the flavor inserts 440 can be maintained spaced apart from the bottom 24 of the container body 14 in a different manner.

In one embodiment, each of the lower retainer arms 346 is made of a stainless steel material. Alternatively, each lower retainer arm 346 can be made of another suitable material.

As illustrated in this embodiment, the upper retainer 344 can be mounted about the oxygenator 230 near the top 26 of the container body 14. Alternatively, the container assembly 10 could include a retainer tube that substantially surrounds the oxygenator 230, and the upper retainer 344 could be mounted about the retainer tube near the top 26 of the container body 14. Still alternatively, the upper retainer 344 can be mounted within the container body 14 in a different position and/or in a different manner.

Additionally, in the embodiment illustrated in FIG. 3, the upper retainer 344 includes a plurality of upper retainer arms 352 that extend radially away from the oxygenator 230 toward the side wall 22 of the container body 14. In this embodiment, the upper retainer 344 includes seven upper retainer arms 352 that are substantially evenly spaced about the oxygenator 230, and that are designed to be substantially vertically aligned with the lower retainer arms 346. Alternatively, the upper retainer 344 can include more than seven or less than seven upper retainer arms 352, depending on the number of flavor inserts 440 that are desired to be retained within the container body 14.

In one embodiment, the second container aperture 20 is uniquely sized and shaped so that only one upper retainer arm 352 can be positioned within and/or removed from the container body 14 through the second container aperture 20 at any given rotational position of the upper retainer 344. In such embodiment, after each upper retainer arm 352 is positioned within and/or removed from the container body 14 through the second container aperture 20, the upper retainer 344 can be rotated, e.g., via rotation of the oxygenator 230, so that another upper retainer arm 352 can be individually positioned within and/or removed from the container body 14 through the second container aperture 20.

Further, in this embodiment, each upper retainer arm 352 includes a step-like design that defines a plurality of insert openings 354, wherein each insert opening 354 is sized and shaped to selectively receive and retain one of the flavor inserts 440. As illustrated, each upper retainer arm 352 can include five insert openings 354 for selectively receiving and retaining up to five flavor inserts 440. Alternatively, each upper retainer arm 352 can be designed to include more than five or less than five insert openings 354, depending on the number of flavor inserts 440 that are desired to be retained within the container body 14. Additionally, in this embodiment, each of the insert openings 354 is a generally rectangular shaped opening that is slightly larger than the cross-section of the flavor inserts 440. Alternatively, for example, one or more of the insert openings 354 can be another shape, such as a circle, a triangle or an octagon.

In one embodiment, each of the upper retainer arms 352 is made of a stainless steel material. Alternatively, each upper retainer arm 352 can be made of another suitable material.

With the present design, a flavor insert 440 can be added to the insert retainer assembly 338 by sliding the flavor insert 440 into one of the insert openings 354 in one of the upper retainer arms 352, into the corresponding insert opening 348 in one of the lower retainer arms 346 and against the arm base 350. In this embodiment, the arm base 350 inhibits further downward movement of the flavor insert 440 relative to the insert retainer assembly 338.

FIG. 4 is a perspective view of a portion of the container assembly 10 illustrated in FIG. 1. In particular, FIG. 4 illustrates that the container assembly 10 includes the one or more flavor inserts 440. As illustrated, each flavor insert 440 can be selectively received and retained within the chamber 14A by the insert retainer assembly 338. In particular, each flavor insert 440 is positioned within and/or extends through one of the insert openings 348 in one of the lower retainer arms 346 and one of the insert openings 354 in one of the upper retainer arms 352.

In the embodiment illustrated in FIG. 4, each flavor insert 440 has a generally rectangular shaped cross-section. Alternatively, for example, one or more of the flavor inserts 440 can have another cross-sectional shape, such as a circular, oval, triangle, or an octagon. In one embodiment, each flavor insert 440 can have a size of approximately three inches wide, twenty-eight inches long and five-sixteenths of an inch thick, although other sizes are equally possible.

With the specific design as disclosed herein above, wherein each retainer 342, 344 includes seven retainer arms 346, 352, and each retainer arm 346, 352 includes five retainer openings 348, 354, the container assembly 10 can hold from zero up to thirty-five flavor inserts 440. Alternatively, with a different design, the container assembly can hold more than thirty-five or less than thirty-five flavor inserts 440.

Additionally, in this embodiment, the insert retainer assembly 338 retains the flavor inserts 440 spaced apart from each other so that almost the entirety of each flavor insert 440 is exposed to the liquid 16 (illustrated in FIG. 1) in the chamber 14A. Further, in one embodiment, the insert retainer assembly 338 retains the flavor inserts 440 in a fashion that allows the flavor inserts 440 to expand and contract.

The ability to impact the flavor of the liquid 16 by inserting different types of flavor inserts 440 into the chamber 14A is a great benefit in creating the finest beverage possible during the aging process. For example, at the beginning of the aging process, ten flavor inserts 440 can be placed in the chamber 14A. The flavor inserts 440 can be a first type of wood or some of the flavor inserts 440 can be of the first type of wood and some of the flavor inserts 440 can be of another type of wood. Subsequently, during the aging process, one or more flavor inserts 440 can be added or removed from the chamber 14A to adjust and influence the aging process. If flavor inserts 440 are added, the flavor inserts 440 can be of the first type of wood or another type of wood.

The one or more flavor inserts 440 impart a flavor on the liquid 16 during the aging process. The number of flavor inserts 440 utilized and the type of flavor inserts 440 utilized can be adjusted to precisely adjust the desired outcome of the liquid 16. With this design, the perfect material and the perfect amount of material for the liquid 16 for extracting flavor during the aging process can be utilized. With the ability to change the number and types of flavor inserts 440 utilized during the aging process, the present invention provides great flexibility in the timing and the flavor development of the liquid 16 during the aging process.

As non-exclusive examples, one or more of the flavor inserts 440 can be made of different species of wood, such as white oak, red oak, redwood, douglas fir, maple, birch, hickory, and/or any combination thereof.

Additionally, as illustrated in FIG. 4, the container assembly 10 further includes an access door 456 that is coupled to the top 26 of the container body 14 and that is adapted to selectively close and seal the insert aperture 20. In different non-exclusive embodiments, the access door 456 can be hingably and/or removably coupled to the top 26 of the container body 14. As the access door is designed to completely cover and seal the insert aperture 20, in certain embodiments, the size of the access door 456 can be such that it is less than approximately twenty-five percent (25%) of the total surface area of the top 26 of the container body 14. More particularly, in one embodiment, the size of the access door 456 can be between approximately five percent (5%) and ten percent (10%) of the total surface area of the top 26 of the container body 14. Alternatively, the access door 456 can be a different size and/or the access door 456 can be coupled to the top 26 of the container body 14 in another manner. For example, the access door 456 can be greater than twenty-five percent (25%) of the total surface area of the top 26 of the container body 14 or less than five percent (5%) of the total surface area of the top 26 of the container body 14.

Through the access door 456 and/or through the insert aperture 20, the flavor inserts 440 can be easily added, removed or replaced from the insert retainer assembly 338 while the liquid 16 is in the chamber 14A and while the insert retainer assembly 338 is positioned within the container body 14. More specifically, the insert aperture 20 and the access door 456 are uniquely sized and shaped so that only a single row of flavor inserts 440 can be added or removed from the container body 14 through the insert aperture 20 and/or the access door 456 at any given rotational position of the retainer insert assembly 338. For example, in one embodiment, only a single row of flavor inserts 440 can be added or removed from a single lower retainer arm 346 and a single upper retainer arm 352 through the insert aperture 20 and/or the access door 456 at any given rotational position of the retainer insert assembly 338. Subsequently, the insert retainer assembly 338 can be rotated so that subsequent rows of the flavor inserts 440 can be individually added or removed from the container body 14 through the insert aperture 20 and/or the access door 456. With this design, the flavor inserts 440 can be removed, renewed, changed, added to or decreased from during the aging process, while the liquid 16 is still in the chamber 14A. The flexibility to change, add or remove the flavor inserts 440 continues through the complete aging process right up to the bottling. This process can be repeated as many times as necessary to extract the optimum flavor and structure from the flavor inserts 440.

In one embodiment, the container body 14 and the access door 456 are made of materials that impart substantially no flavor on the liquid 16 and that are substantially liquid impervious. For example, in one embodiment, one or both of the container body 14 and the access door 456 are made of stainless steel or aluminum. With this design, the container body 14 and the access door 456 can be easily cleaned and reused with many different liquids 16. Moreover, having the ability to quickly and easily change the flavor inserts 440 allows the user to easily convert his barrel inventory from one type of wood flavoring component to another, even adding more wood or subtracting undesirable flavoring components, without having to purchase entirely new containers. Thus, the present invention provides many economic, environmental and manufacturing advantages over the older more traditional aging equipment. For example, once the initial investment in the container 12 is made, the cost to achieve the highest barrel quality is only a function of the cost of the flavor inserts 440. The cost to replace the flavor inserts 440 inside the container 12 with flavor inserts 440 of comparable wood and quality can be less than approximately 10% the cost of a similar new wood barrel. As an example, a typical high end barrel used for only the finest wines is typically made from French oak and can cost approximately $900 to $1,000. To achieve the same French oak surface area ratio to volume of liquid utilizing flavor inserts 440 with the present design, it can cost between approximately $30 and $40. Further, the useful life of such a wood barrel is typically only one or two vintages at which point the wood in contact with the liquid loses the ability to impart flavors on the liquid. Accordingly, the present invention allows a user with limited financial resources the opportunity to use high end wood flavoring components every vintage with totally flexible barrel inventory.

Additionally, as noted above, the use of the access door 456 as provided herein, allows the insert retainer assembly 338 to be installed inside the container body 14 through the insert aperture 20.

Further, in the embodiment illustrated in FIG. 4, the container assembly 10 also includes a rotator 458 that is coupled to the oxygenator 230 for selectively rotating the oxygenator 230 (illustrated in FIG. 2), the insert retainer assembly 338 and the flavor inserts 440 within the container body 14, i.e. within the chamber 14A. More specifically, in this embodiment, the rotator 458 can be used to selectively move and/or rotate the oxygenator 230, the insert retainer assembly 338 and one or more of the flavor inserts 440 relative to the rest of the container assembly 10. As illustrated, the rotator 458 is centrally located relative to the top 26 of the container body 14 substantially adjacent to the upper mount 236 of the oxygenator mount assembly 232. Additionally, the rotator 458 is designed to completely cover and seal the rotator aperture 18. Alternatively, the rotator 458 can be positioned in another location relative to the container body 14.

With the present design, the rotator 458 can be used to selective rotate the oxygenator 230, the insert retainer assembly 338 and the flavor inserts 440 without opening the chamber 14A, with the chamber 14A sealed and with the chamber 14A full of liquid 16.

In one embodiment, the rotator 458 can be a knob that can be manually and selectively rotated by the user. Alternatively, the rotator 458 can include a handle or some other means to enable the user to manually and selectively rotate the rotator 458. Additionally and/or alternatively, the rotator 458 can include a motor (not illustrated) that enables the user to automatically rotate the oxygenator 230 and the insert retainer assembly 338 and the flavor inserts 440 within the chamber 14A.

The purpose of the rotation of the insert retainer assembly 338 is to enable the user to position the upper retainer arms 352 and the lower retainer arms 346 so that the flavor inserts 440 can be inserted into or removed from the chamber 14A via the access door 456. Additionally, the flavor inserts 440 can be inserted or removed in this manner, as desired, when the chamber 14A is full of liquid 16 or when the chamber 14A contains no liquid.

Further, the size and positioning of the access door 456 in combination with the ability to rotate the oxygenator 230 with the rotator 458 enables the user to install the insert retainer assembly 338 through the access door 456 without removing the top 26 of the container body 14. Moreover, the features of the container assembly 10, as described in detail herein, enable the oxygenator 230, the insert retainer assembly 338 and the one or more flavor inserts 440 to be installed through the access door 456, i.e. through the insert aperture 20, without otherwise disassembling the container 12.

An additional benefit to utilizing the rotator 458 to rotate the oxygenator 230, the insert retainer assembly 338 and the flavor inserts 440 is that this operation effectively stirs the liquid 16 that is in the chamber 14A. This operation is easy to perform while the container 12 is in any orientation, horizontal, vertical or anywhere in between. This stirring process is referred to as "stirring of the lees", and it is required frequently during the aging of wine and spirits. For example, some winemakers stir the lees every 2 to 4 weeks. Moreover, the present stirring process as disclosed herein is much simpler and easier than traditional methods for stirring the lees, and it can do a much more thorough and consistent job of stirring than current traditional methods.

FIG. 5 is a partially exploded perspective view of a portion of the container assembly 10 illustrated in FIG. 1. In particular, FIG. 5 illustrates a lower retainer arm 346, an upper retainer arm 352, and five flavor inserts 440 that can be easily installed in modular fashion within the chamber 14A through the access door 456.

Additionally, FIG. 5 illustrates that in one embodiment, each upper retainer arm 352 can further include an arm lock 560 that extends upward from and over top of the remainder of the upper retainer arm 352. In particular, the arm lock 560 can be selectively coupled to the upper retainer arm 352 near an outer edge of the upper retainer arm 352, i.e. near the edge of the upper retainer arm 352 closest to the side wall 22 of the container body 14. Further, the arm lock 560 can be selectively coupled to the outer surface of the oxygenator 230 and/or to an inner edge of the upper retainer arm 352 substantially adjacent to the oxygenator 230. With this design, when the flavor inserts 440 are positioned within the insert openings 354, the flavor inserts 440 are inhibited from moving (e.g., floating) upward relative to the container body 14. Moreover, this design enables the flavor inserts 440 to be maintained spaced apart from the top 26 of the container body 14. Alternatively, the arm lock 560 can have a different design. Still alternatively, the upper retainer arms 352 can be designed without the arm lock 560, and the flavor inserts 440 can be allowed to contact the top 26 of the container body 14 or the flavor inserts 440 can be maintained spaced apart from the top 26 of the container body 14 in a different manner.

Figure 6A:
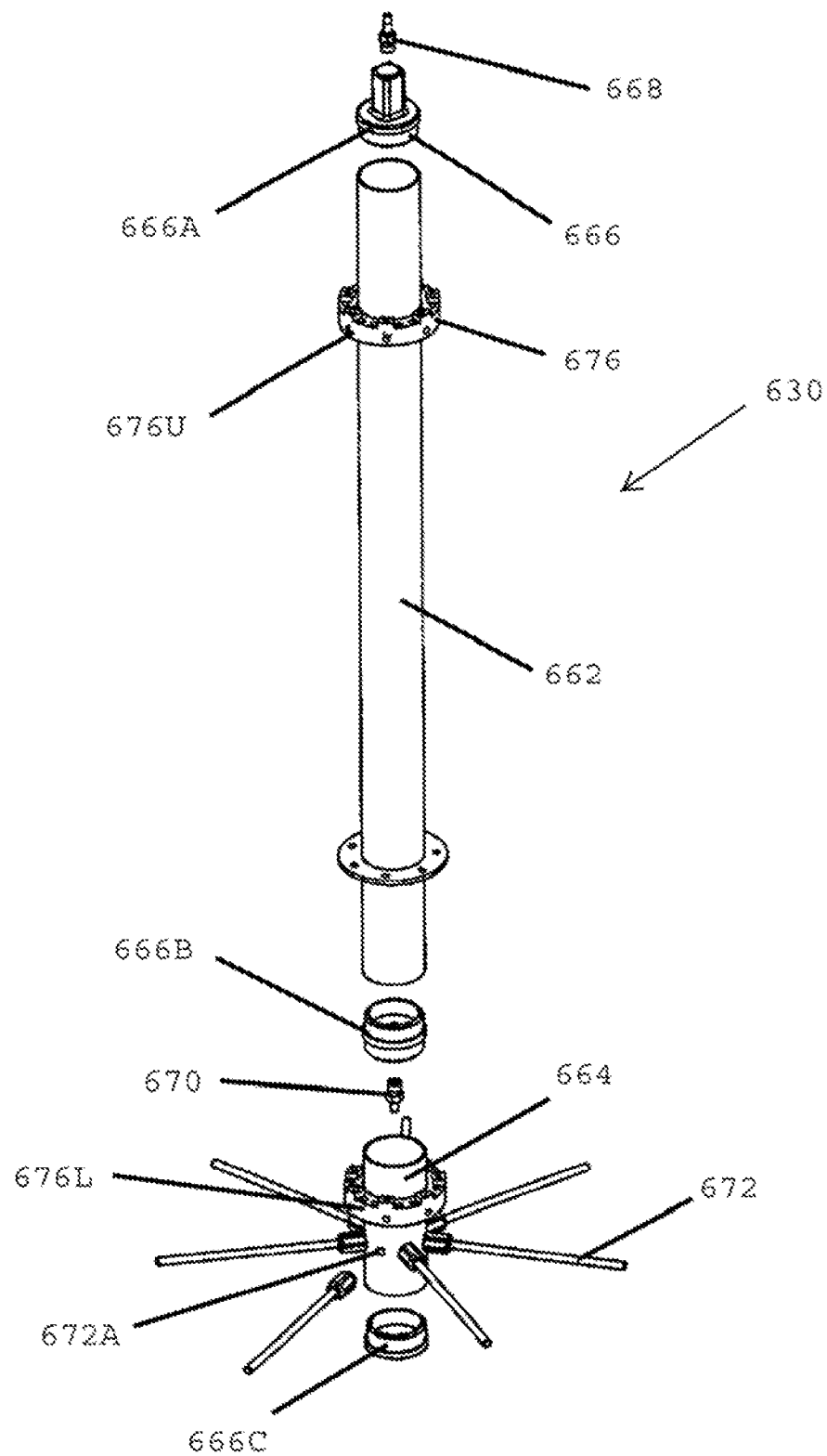
FIG. 6A is a partially exploded perspective view of an embodiment of an oxygenator having features of the present invention.

FIG. 6A is a partially exploded perspective view of an embodiment of an oxygenator 630 having features of the present invention. As provided above, the oxygenator 630 can be precisely controlled to enable the user, e.g. the wine maker, to release oxygen, or other fluid, into the liquid 16 (illustrated in FIG. 1) at any desired rate and time. Additionally, by positioning the oxygenator 630 substantially within the chamber 14A, as illustrated in FIG. 2, the oxygenator 630 provides a practical and convenient source for introducing oxygen into the liquid 16 (illustrated in FIG. 1) that is contained within the chamber 14A.

The design of the oxygenator 630 can be varied to suit the specific design requirements of the container assembly 10 (illustrated in FIG. 1). As described herein, the integrated system of the oxygenator 630 has been created to simulate the natural breathing of a wood barrel in a non-breathing aging container, such as a stainless steel container. Additionally, the oxygenator 630 creates the aging qualities afforded by a traditional wood barrel, but can utilize stainless steel containers, which are more economical and have a longer service life.

As illustrated in FIG. 6A, the oxygenator 630 includes a first tank 662, a second tank 664, a plurality of caps 666, a first valve 668, a second valve 670, and one or more diffusers 672.

The first tank 662 is a high pressure storage tank which is adapted for storing at least a majority of the oxygen that can be released over time as desired into the chamber 14A. As such, the first tank 662 can function as and/or be referred to as a fluid source, e.g., an oxygen source. In the embodiment illustrated in FIG. 6A, the first tank 662 is a long slender tube with a substantially circular cross-sectional shape. Alternatively, the first tank 662 can have a different design. For example, in certain non-exclusive alternative embodiments, the first tank 662 can have a substantially square, rectangle, triangle or oval cross-sectional shape. As illustrated above in FIG. 2, the first tank 662 can be conveniently positioned within the chamber 14A, such that the first tank 662 extends generally downward from the top 26 (illustrated in FIG. 2) of the container body 14 (illustrated in FIG. 2) most of the way toward the bottom 24 (illustrated in FIG. 2) of the container body 14.

In certain embodiments, the first tank 662 can be designed to hold a certain volume of oxygen that can be compressed at a certain pressure. For example, in one embodiment, the first tank 662 can be designed to hold approximately 0.5 cubic feet of oxygen that is compressed at approximately two hundred pounds per square inch (psi). In another embodiment, the first tank 662 can be designed to hold approximately five cubic feet of oxygen that is compressed at approximately three hundred psi. Alternatively, the first tank 662 can be designed to hold different volumes of oxygen that can be compressed to different extents that those specifically disclosed herein. For example, the first tank 662 can be designed to hold more than five or less than 0.5 cubic feet of compressed oxygen, and/or the oxygen can be compressed to greater than approximately three hundred psi or less than approximately two hundred psi, depending on the requirements of the container assembly 10.

In this embodiment, the second tank 664 is integrated with and/or coupled to the first tank 662. Moreover, the second tank 664 is in fluid communication with the first tank 662. The second tank 664 is used as a regulated dispersion oxygen tank, which receives oxygen from the first tank 662, i.e. the oxygen source, and which releases oxygen into the liquid 16 through the diffusers 672. As such, the second tank 664 functions essentially as a conduit through which the oxygen can be introduced into the liquid 16 via the one or more diffusers 672. Additionally, in one embodiment, the second tank 664 can also store a relatively small portion of the oxygen that can be released over time as desired into the chamber 14A.

In the embodiment illustrated in FIG. 6A, the second tank 664 is a short slender tube with a substantially circular cross-sectional shape. Alternatively, the second tank 664 can have a different design. For example, in certain non-exclusive alternative embodiments, the second tank 664 can have a substantially square, rectangle, triangle or oval cross-sectional shape. Further, in the embodiment illustrated in FIG. 6A, the length of the second tank 664 is approximately one-sixth the length of the first tank 662. Alternatively, the relative lengths of the second tank 664 and the first tank 662 can be different. For example, the second tank 664 can have a length that is greater than or less than one-sixth the length of the first tank 662.

It should be noted that the use of the terms "first tank" and "second tank" is merely for ease of discussion, and either tank can be referred to as the first tank or the second tank.

In the embodiment illustrated in FIG. 6A, the plurality of caps 666 includes a first cap 666A, a second cap 666B and a third cap 666C.

The first cap 666A seals an end of the first tank 662 positioned away from the second tank 664. In particular, the first cap 666A seals the end of the first tank 662 that is positioned substantially adjacent to the top 26 of the container body 14 when the oxygenator 630 is positioned within the chamber 14A.

The second cap 666B seals the connection between the first tank 662 and the second tank 664.

The third cap 666C seals an end of the second tank 664 positioned away from the first tank 662. In particular, the third cap 666C seals the end of the second tank 664 that is positioned substantially adjacent to the bottom 24 of the container body 14 when the oxygenator 630 is positioned within the chamber 14A.

It should be noted that the use of the terms "first cap", "second cap" and "third cap" is merely for ease of discussion, and any of the caps can be referred to as the first cap, the second cap or the third cap.

The first valve 668 is positioned substantially adjacent to the first cap 666A. The first valve 668 provides an access port to enable the user to quickly and easily introduce oxygen into and/or remove oxygen from the first tank 662. Stated another way, the first valve 668 enables the user to store a specific volume and pressure of oxygen within the first tank 662, such that the first tank 662 can function as the oxygen source for introducing the oxygen into the liquid 16 during the aging process.

The second valve 670 is positioned substantially between the first tank 662 and the second tank 664 and substantially adjacent to the second cap 666B. The second valve 670 can be a pressure valve that regulates the volume and rate of the oxygen that is being passed from the first tank 662, i.e. the oxygen source, to the second tank 664 so that a desired amount of the oxygen can be introduced into the liquid 16 at a desired rate during the aging process. In one embodiment, the second valve 670 functions at a predetermined setting during the aging process so as to best simulate the natural breathing of a wood barrel in a non-breathing aging container. Alternatively, in one embodiment, the oxygenator 630 can include a control system (not illustrated) with which the second valve 670 can be controlled so as to control and/or adjust the amount and rate of the oxygen that is being introduced into the liquid 16.

It should be noted that the use of the terms "first valve" and "second valve" is merely for ease of discussion, and either valve can be referred to as the first valve or the second valve.

As provided herein, the one or more diffusers 672 are in fluid communication with the second tank 664 and, as such, are adapted to controllably release oxygen from the second tank 664 into the liquid 16. More particularly, the diffusers 672 function essentially as a conduit through which the oxygen that is passed from the first tank 662 to the second tank 664 can be controllably released into the liquid 16 during the aging process. As illustrated, each of the one or more diffusers 672 can be coupled to the second tank 664 via a diffuser aperture 672A. Alternatively, the one or more diffusers 672 can be coupled to the second tank 664 in a different manner. In this embodiment, the one or more diffusers 672 are positioned so as to extend laterally or radially away from the second tank 664. With this design, the diffusers 672 are able to disperse the oxygen substantially equally throughout the liquid 16 during the aging process.

In one alternative embodiment, the oxygenator 630 can include one or more diffuser valves (not illustrated) that can be utilized to individually and independently control the oxygen that is being introduced into the liquid through each of the diffusers 672.

Further, as illustrated in FIG. 6A, a pair of mounting rings 676 are positioned about the oxygenator 630 to provide points at which the lower retainer 342 (illustrated in FIG. 3) and the upper retainer 344 (illustrated in FIG. 3) can be mounted about the oxygenator 630. In particular, a lower mounting ring 676L is mounted about the oxygenator 630 substantially adjacent to the second tank 664 to provide a point at which the lower retainer 342 can be mounted about the oxygenator 630. Additionally, an upper mounting ring 676U is mounted about the oxygenator 630 near the end of the first tank 662 that is positioned away from the second tank 664 to provide a point at which the upper retainer 344 can be mounted about the oxygenator 630.

Figure 6B:
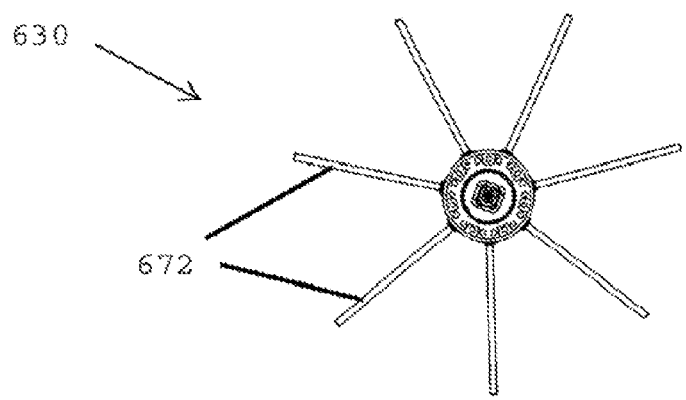
FIG. 6B is a top view of the oxygenator illustrated in FIG. 6A.

FIG. 6B is a top view of the oxygenator 630 illustrated in FIG. 6A. In particular, FIG. 6B illustrates that this embodiment of the oxygenator 630 includes seven diffusers 672 that extend radially outward away from the remainder of the oxygenator 630 and that are substantially evenly spaced about the oxygenator 630, i.e. about the second tank 664 (illustrated in FIG. 6A) of the oxygenator 630. Alternatively, the oxygenator 630 can be designed to include greater than seven or less than seven diffusers 672.

Referring back to FIG. 3, each of the diffusers 672 is positioned such that the diffuser 672 is substantially centrally located between adjacent lower retainer arms 346. Alternatively, the diffusers 672 and the lower retainer arms 346 can have a different positional relationship relative to one another.

Figure 6C:
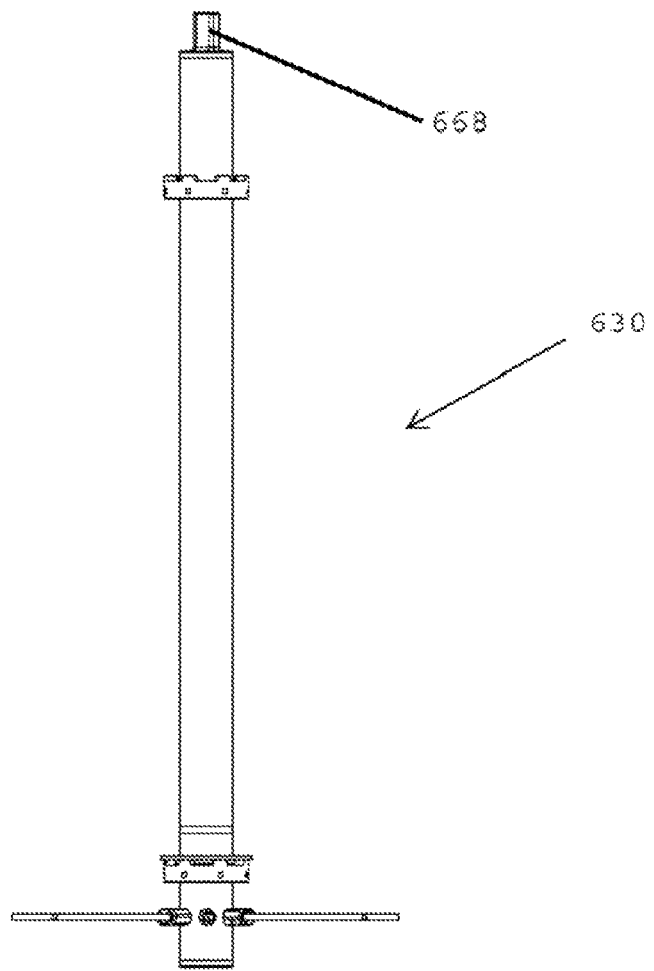
FIG. 6C is a side view of the oxygenator illustrated in FIG. 6A.

FIG. 6C is a side view of the oxygenator 630 illustrated in FIG. 6A. In particular, FIG. 6C illustrates the oxygenator 630 in a fully assembled condition such that the oxygenator 630 can be quickly and easily positioned within the container body 14 (illustrated in FIG. 1), i.e. the chamber 14A (illustrated in FIG. 1), in order to enable the user to effectively control the introduction of oxygen into the liquid 16 (illustrated in FIG. 1) that is being aged within the container 12

(illustrated in FIG. 1). Additionally, as shown in FIG. 6C, the first valve 668 can be easily accessed by the user in order to quickly and easily introduce oxygen into and/or remove oxygen from the first tank 662 while the oxygenator 630 is positioned within the container 12.

FIG. 7A is a partially exploded perspective view of another embodiment of an oxygenator 730 having features of the present invention. The design of the oxygenator 730 is somewhat similar to the oxygenator 630 illustrated and described above in relation to FIG. 6A. For example, in the embodiment illustrated in FIG. 7A, the oxygenator 730 includes a first tank 762, a second tank 764, a first cap 766A, a third cap 766C, a first valve 768, a second valve 770, and one or more diffusers 772 (illustrated in FIG. 7B) that are substantially similar to the first tank 662, the second tank 664, the first cap 666A, the third cap 666C, the first valve 668, the second valve 670, and the one or more diffusers 672 illustrated and described above in relation to FIG. 6A. Accordingly, a detailed description of such elements will not be repeated. Additionally, in the embodiment illustrated in FIG. 7A, the oxygenator 730 further includes a connector 780.

As in the previous embodiment, the first tank 762, i.e. the fluid source or oxygen source, is a high pressure storage tank which is adapted for storing at least a majority of the fluid, e.g., oxygen, that can be released over time as desired into the chamber 14A (illustrated in FIG. 1). Similar to the previous embodiment, the first tank 762 is a long slender tube with a substantially circular cross-sectional shape that is designed to hold a certain volume of oxygen that can be compressed at a certain pressure. In this embodiment, the first tank 762 can be conveniently positioned within the chamber 14A, such that the first tank 762 extends generally downward from the top 26 (illustrated in FIG. 2) of the container body 14 (illustrated in FIG. 2) approximately half way toward the bottom 24 (illustrated in FIG. 2) of the container body 14.

Additionally, as in the previous embodiment, the second tank 764 is integrated with and/or coupled to the first tank 762, and the second tank 764 is in fluid communication with the first tank 762. Further, the second tank 764 is used as a regulated dispersion oxygen tank or conduit, which receives oxygen from the first tank 762, i.e. the oxygen source, and which releases oxygen into the liquid 16 through the diffusers. In the embodiment illustrated in FIG. 7A, the second tank 764 is a long slender tube with a substantially circular cross-sectional shape, wherein the length of the second tank 664 is approximately the same as the length of the first tank 762. Alternatively, the lengths of the second tank 764 and the first tank 762 can be different. Additionally, in this embodiment, the second tank 764 can function as a second and/or backup fluid source.

The connector 780 is positioned substantially between and connects the first tank 762 and the second tank 764. Further, the connector 780 seals the connection between the first tank 762 and the second tank 764. As illustrated in FIG. 7A, the connector 780 includes a connector aperture 782 that extends transversely through the connector 780. The connector aperture 782 is adapted to receive a pipe or other conduit (not illustrated) that can be used for filling the liquid 16 (illustrated in FIG. 1) into the chamber 14A, pumping or otherwise removing the liquid 16 from the chamber 14A, or racking of the liquid 16 within the chamber 14A. More particularly, the connector aperture 782 is aligned with the bunghole (not illustrated) that extends through the container body 14, such that the connector aperture 782 and the bunghole cooperate to receive the pipe or conduit that can be used for filling the liquid 16 into the chamber 14A, pumping or otherwise removing the liquid 16 from the chamber 14A, or racking of the liquid 16 within the chamber 14A.

FIG. 7B is a side view of the oxygenator 730 illustrated in FIG. 7A. In particular, FIG. 7B illustrates the oxygenator 730 in a fully assembled condition such that the oxygenator 730 can be quickly and easily positioned within the container body 14 (illustrated in FIG. 1), i.e. the chamber 14A (illustrated in FIG. 1), in order to enable the user to effectively control the introduction of oxygen into the liquid 16 (illustrated in FIG. 1) that is being aged within the container 12 (illustrated in FIG. 1).

Figure 8:
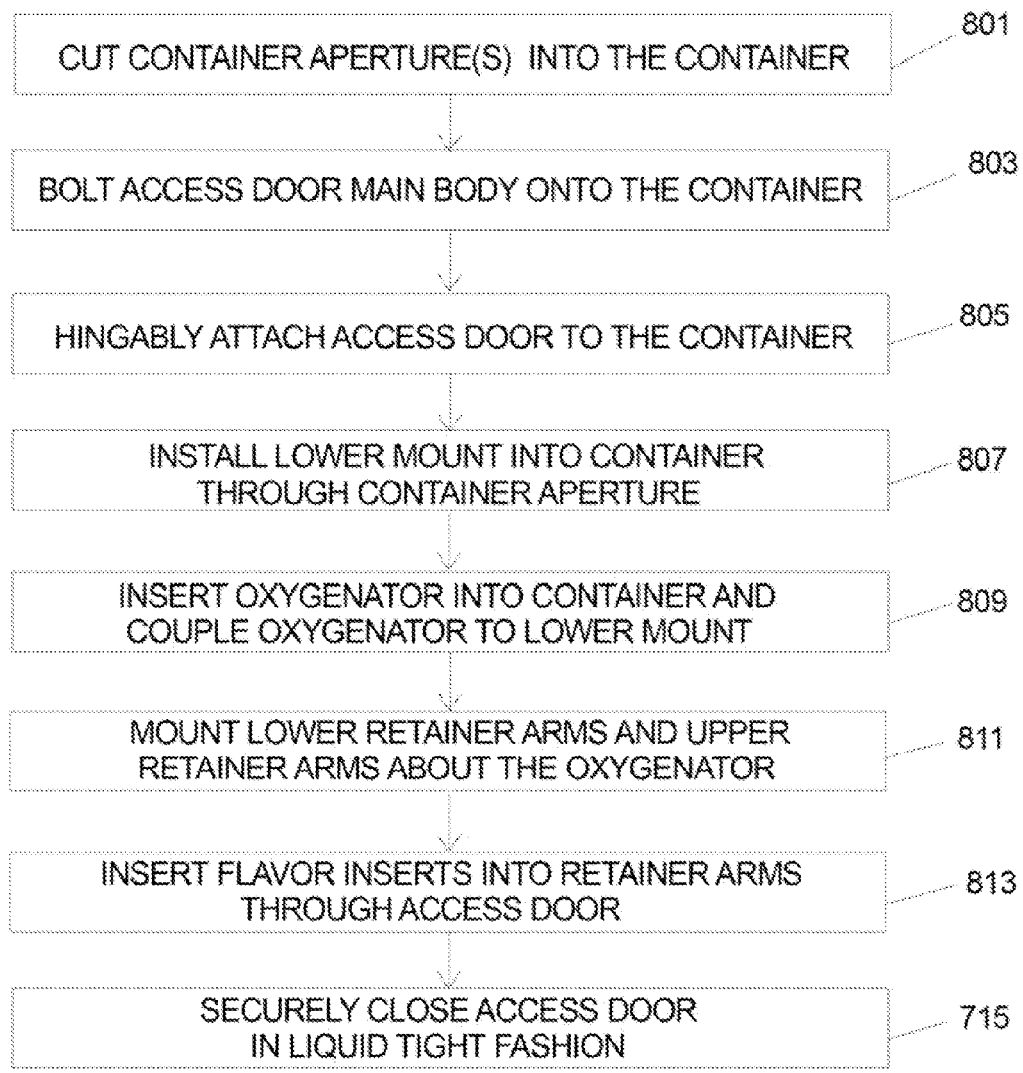
FIG. 8 is a simplified flow chart that outlines one embodiment of a process for installing an access door and an insert retainer assembly in an existing wood barrel.

FIG. 8 is a simplified flow chart that outlines an embodiment of a process for installing an access door, an oxygenator, and an insert retainer assembly in a container. In different embodiments, the access door and the insert retainer assembly can be installed in a stainless steel container or in an existing wood barrel. It should be noted that the installation of the access door, the oxygenator, and the insert retainer assembly in an existing wood barrel is unique in that it can be accomplished with ease onsite at the winery if desired without disassembling the barrel.

Initially, in step 801, one or more container apertures are cut into the container. In particular, a container aperture can be cut into the container that is sized and shaped to accommodate a portion of the oxygenator and the rotator, and/or a container aperture can be cut into the container that is sized and shaped to fit the access door components. In one embodiment, the container aperture that is designed to fit the access door components is substantially rectangular and is approximately four inches by twelve inches in size. Next, in step 803, the access door main body is thru bolted onto the container with a bottom flange (inside the container) and a top flange (outside the container), thereby creating a strong structural liquid tight seal. Subsequently, in step 805, the access door is assembled, such that the access door is coupled to the container. For example, in different non-exclusive embodiments, the access door can be hingably and/or removably coupled to the container.

Next, in step 807, a lower mount is installed through the container aperture, i.e. through the access door, and the lower mount is attached to the interior surface on the bottom of the container. Then, in step 809, the oxygenator, which provides a pivot point for the rotator, is inserted down through the container aperture until it reaches the bottom of the container, and the oxygenator is coupled to the lower mount. Subsequently, in step 811, the lower retainer arms and the upper retainer arms are mounted about the oxygenator. The retainer arms are easily mounted about the oxygenator by rotating the oxygenator and timing the retainer arms in relationship to the access door opening, i.e. to the container aperture. This step is repeated until all of the lower retainer arms and the upper retainer arms are mounted about the oxygenator.

Next, in step 813, the desired number and type of flavor inserts are inserted through the access door and consecutively into the upper retainer arms and the lower retainer arms. The flavor inserts are now retained securely within the container by the upper retainer arms and the lower retainer arms. Finally, in step 815, the access door is closed securely in a liquid tight fashion and the container is ready for the liquid, e.g., the wine or spirit, to be introduced into the container in a traditional fashion through a bunghole.

It should be noted that some of the steps as described herein can be combined or eliminated and/or the order of some of the steps can be altered without otherwise changing the purpose and/or results of the above-recited process.

While a number of exemplary aspects and embodiments of a container assembly 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A container assembly for retaining a liquid during aging of the liquid, the container assembly comprising:
   a container including a container body that defines a chamber that receives and retains the liquid; and
   an oxygenator that releases a fluid into the chamber while the chamber is retaining the liquid, the oxygenator being positioned substantially within the chamber, the oxygenator retaining the fluid within the chamber and releasing the fluid over time into the liquid within the chamber; wherein the oxygenator includes (i) a fluid tank that retains the fluid, the fluid tank being positioned within the chamber, (ii) a diffuser that is in fluid communication with the fluid tank, the diffuser being positioned within the chamber, and (iii) a valve for selectively controlling the release of the fluid from the fluid tank to the diffuser, the valve being positioned within the chamber.

2. The container assembly of claim 1 wherein the valve regulates the volume and rate of flow of the fluid that is being released from the fluid tank into the liquid.

3. The container assembly of claim 1 wherein the container includes a central axis and wherein the fluid tank extends along the central axis.

4. The container assembly of claim 1 further comprising a mount assembly that rotatably secures the oxygenator to the container body so that the oxygenator is selectively rotatable relative to the container.

5. The container assembly of claim 4 further comprising an insert retainer assembly and one or more flavor inserts, the insert retainer assembly being secured to the oxygenator within the chamber, the insert retainer assembly selectively receiving and retaining the one or more flavor inserts within the chamber.

6. The container assembly of claim 5 wherein the container further includes a container aperture that extends through a top of the container body, the container aperture having a size that is less than approximately twenty-five percent of the total surface area of the top of the container body; and wherein the container further includes an access door that selectively closes and seals the container aperture.

7. A container assembly for retaining a liquid during aging of the liquid, the container assembly comprising:
   a container including a container body that defines a chamber that receives and retains the liquid;
   an oxygenator that releases a fluid into the chamber while the chamber is retaining the liquid, the oxygenator being positioned substantially within the chamber, the oxygenator retaining the fluid within the chamber and releasing the fluid over time into the liquid within the chamber; and
   an insert retainer assembly and one or more flavor inserts, the insert retainer assembly being fixedly secured to the oxygenator within the chamber, the insert retainer assembly selectively receiving and retaining the one or more flavor inserts within the chamber.

8. The container assembly of claim 7 further comprising a mount assembly that rotatably secures the oxygenator to the container body so that the oxygenator, the insert retainer assembly and the one or more flavor inserts are selectively rotatable relative to the container.

9. A container assembly for retaining a liquid during aging of the liquid, the container assembly comprising:
   a container including a container body that defines a chamber that receives and retains the liquid; and
   an oxygenator that releases a fluid into the chamber while the chamber is retaining the liquid, the oxygenator being positioned substantially within the chamber, the oxygenator retaining the fluid within the chamber and releasing the fluid over time into the liquid within the chamber; wherein the oxygenator includes a valve that allows for the filling of the oxygenator with fluid.

10. The container assembly of claim 9 wherein the container body includes a top, a bottom, a side wall, a container aperture that extends through the top, and an access door that selectively closes and seals the container aperture; wherein the container assembly further comprises (i) an insert retainer assembly positioned within the chamber, the insert retainer assembly including a plurality of retainer arms, with each retainer arm extending radially toward the side wall, wherein each retainer arm includes a plurality of spaced apart insert openings; (ii) a plurality of flavor inserts that impart a flavor on the liquid, each flavor insert being sized and shaped to fit through the container aperture and into one of the insert openings; and a mount assembly that rotatable secures the insert retainer assembly to the container body so that the insert retainer assembly is selectively rotatable relative to the container body to selectively move each retainer arm to adjacent the container aperture so that the flavor inserts can be inserted or removed from the container through the container aperture.

11. The container assembly of claim 10 wherein the container aperture has a size that is less than approximately twenty-five percent of a total surface area of the top of the container body.

12. The container assembly of claim 10 wherein the container aperture extends radially from a center of the top to a perimeter of the top.

13. A container assembly for retaining a liquid during aging of the liquid, the container assembly comprising:
   a container including (i) a container body that defines a chamber that receives and retains the liquid, the container body including a top; (ii) a container aperture that extends through the top, the container aperture having a size that is less than approximately twenty-five percent of a total surface area of the top; and (iii) an access door that selectively closes and seals the container aperture;
   a flavor insert that imparts a flavor on the liquid;
   an insert retainer assembly positioned within the chamber that selectively receives and retains the flavor insert within the chamber;
   an oxygenator that releases a fluid into the chamber while the chamber is retaining the liquid, the oxygenator being positioned substantially within the chamber, the oxygenator retaining the fluid within the chamber and releasing the fluid over time into the liquid within the chamber; wherein the insert retainer assembly is fixedly secured to the oxygenator; and
   a mount assembly that rotatable secures the insert retainer assembly to the container body so that the insert retainer assembly is selectively rotatable relative to the container body to selectively move the flavor insert adjacent to the container aperture and away from the container aperture.

14. The container assembly of claim 13 wherein the mount assembly rotatable secures the insert retainer assembly to the top and a bottom of the container body.

15. The container assembly of claim 13 wherein the insert retainer assembly includes a plurality of retainer arms that extend substantially radially from near a central axis of the container.

16. The container assembly of claim 15 wherein each retainer arm selectively receives and retains a plurality of flavor inserts spaced apart from each other.

17. The container assembly of claim 13 wherein the container aperture has a size that is between approximately five percent and ten percent of the total surface area of the top of the container body.

18. A container assembly for retaining a liquid during aging of the liquid, the container assembly comprising:
   a container including (i) a container body that defines a chamber that receives and retains the liquid, the container body including a top; (ii) a container aperture that extends through the top, the container aperture having a size that is less than approximately twenty-five percent of a total surface area of the top; and (iii) an access door that selectively closes and seals the container aperture;
   a plurality of flavor inserts that impart a flavor on the liquid;
   an oxygenator that releases a fluid into the chamber while the chamber is retaining the liquid, the oxygenator being positioned substantially within the chamber, the oxygenator retaining the fluid within the chamber and releasing the fluid over time into the liquid within the chamber;
   an insert retainer assembly positioned within the chamber that selectively receives and retains the flavor inserts within the chamber, the insert retainer assembly being fixedly secured to the oxygenator; and
   a mount assembly that rotatable secures the oxygenator and the insert retainer assembly to the container body so that the oxygenator and the insert retainer assembly are selectively rotatable relative to the container body to selectively move the flavor inserts adjacent to the container aperture and away from the container aperture.

19. The container assembly of claim 18 wherein the insert retainer assembly includes a plurality of retainer arms that extend substantially radially from near a central axis of the container; wherein each retainer arm selectively receives and retains a plurality of flavor inserts spaced apart from each other.

20. The container assembly of claim 18 wherein the oxygenator includes (i) a fluid tank that retains the fluid, the fluid tank being positioned within the chamber, (ii) a diffuser that is in fluid communication with the fluid tank, the diffuser being positioned within the chamber, and (iii) a valve for selectively controlling the release of the fluid from the fluid tank to the diffuser, the valve being positioned within the chamber; wherein the valve regulates the volume and rate of flow of the fluid that is being released from the fluid tank into the liquid.

* * * * *